(12) United States Patent
Carobus et al.

(10) Patent No.: US 7,203,684 B2
(45) Date of Patent: Apr. 10, 2007

(54) SERVING CONTENT-TARGETED ADS IN E-MAIL, SUCH AS E-MAIL NEWSLETTERS

(75) Inventors: Alexander Paul Carobus, Mountain View, CA (US); Alex Roetter, Palo Alto, CA (US); Ben Davenport, Mountainview, CA (US)

(73) Assignee: Google, Inc, Mountainview, CA (US)

( * ) Notice: Subject to any disclaimer, the term of this patent is extended or adjusted under 35 U.S.C. 154(b) by 182 days.

(21) Appl. No.: 10/699,607

(22) Filed: Oct. 31, 2003

(65) Prior Publication Data

US 2005/0076051 A1 Apr. 7, 2005

Related U.S. Application Data

(60) Provisional application No. 60/509,164, filed on Oct. 7, 2003.

(51) Int. Cl.
G06F 17/30 (2006.01)
G06Q 30/00 (2006.01)

(52) U.S. Cl. .............................. 707/10; 707/3; 707/101; 707/102; 707/103 X; 707/104.1; 705/14

(58) Field of Classification Search .................... 707/3, 707/10, 101, 102, 103 X, 104.1; 705/14
See application file for complete search history.

(56) References Cited

U.S. PATENT DOCUMENTS

| | | | |
|---|---|---|---|
| 2002/0082923 A1* | 6/2002 | Merriman et al. ............. | 705/14 |
| 2002/0082941 A1* | 6/2002 | Bird ............................ | 705/26 |
| 2002/0147646 A1* | 10/2002 | Ogura et al. .................. | 705/14 |
| 2003/0110225 A1* | 6/2003 | Billadeau ..................... | 709/206 |
| 2004/0249709 A1 | 12/2004 | Donovan et al. | |
| 2004/0267725 A1* | 12/2004 | Harik ........................... | 707/3 |
| 2005/0060318 A1* | 3/2005 | Brickman, Jr. ............... | 707/10 |
| 2005/0096980 A1 | 5/2005 | Koningstein | |

FOREIGN PATENT DOCUMENTS

WO WO 01/39010 A2 * 5/2001
WO WO 01/48665 A1 * 7/2001

OTHER PUBLICATIONS

Acey, Madleine, "Web ads that hit the button, Broker dynamically targets news content," *FTMarketWatch*, (May 10, 2001), 2 pgs.

* cited by examiner

*Primary Examiner*—Thuy N. Pardo
(74) *Attorney, Agent, or Firm*—Straub and Pokotylo; John C. Pokotylo

(57) ABSTRACT

Content-targeted ads are served with e-mail. A unique content identifier ("CUID") is included in the content. A client device passes the CUID to an ad server in a an ad request. The ad server uses the CUID to identify previously registered content for determining content-relevant ads. Current information may be used when choosing and/or ordering ads. Thus, ads can be chosen and generated when the user "opens" the e-mail. An ad image may display ads in the document. Ad impression information may be encoded in a unique identifier, returned along with the ad image. The ad image and unique identifier may be provided to a client device. This unique identifier and an image map click position may be returned to the ad server upon ad selection. The ad server may use the returned information to determine the selected ad.

33 Claims, 5 Drawing Sheets

SERVING CONTENT-TARGETED ADS IN E-MAIL, SUCH AS E-MAIL NEWSLETTERS

§0. RELATED APPLICATION

This application claims benefit to U.S. Provisional Application Ser. No. 60/509,164, now expired, titled "SERVING CONTENT-TARGETED ADS IN E-MAIL, SUCH AS E-MAIL NEWSLETTERS," filed on Oct. 7, 2003, and listing Alexander Paul Carobus, Alex Roetter, and Ben Davenport as the inventors. That application is expressly incorporated herein by reference. The scope of the present invention is not limited to any requirements of the specific embodiments in that application.

§1. BACKGROUND OF THE INVENTION

§1.1 Field of the Invention

The present invention concerns advertising. In particular, the present invention concerns expanding the opportunities for advertisers to target their ads.

§1.2 Related Art

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.) Query keyword relevant advertising has been used by search engines, such as the AdWords advertising system by Google of Mountain View, Calif. Similarly, content-relevant advertising systems have been proposed. For example, U.S. patent application Ser. No. 10/314,427 (incorporated herein by reference and referred to as "the '427 application") now pending, titled "METHODS AND APPARATUS FOR SERVING RELEVANT ADVERTISEMENTS", filed on Dec. 6, 2002 and listing Jeffrey A. Dean, Georges R. Harik and Paul Bucheit as inventors, and 10/375,900, now U.S. Pat. No. 7,136,875, (incorporated by reference and referred to as "the '900 application") titled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Some embodiments of the '900 application use embedded information and/or instructions, such as IFRAMEs or JavaScript for example, to insert ads into documents that are difficult to analyze (e.g., crawl and cache) in advance, such as dynamically generated Web pages, Web pages that are changed or updated often, etc.

Serving content-targeted ads in e-mail newsletters is a potential source of a large number of additional quality page-views for advertisers. As shown in FIG. 1, in a networked environment 100, a publisher 110 can publish a document 115, such as an e-mail newsletter, and distribute it to client devices 120/130 of end users. An instance of the document 124/134 may be read by an e-mail reader 122 (e.g., Outlook from Microsoft Corporation, etc.) residing on a client device 120, and/or by a browser 132 (e.g., Internet Explorer, Netscape, Opera, etc.) residing on a client device 130 and accessing a Web-based e-mail server 140, also referred to as a proxy e-mail client (e.g., Hotmail, Yahoo-Mail, etc.). A content-relevant ad server 150, such as those described in the '427 and '900 applications, may be used to serve ads relevant to content found in documents such as e-mails. The facilities and/or components described may communicate with one another via one or more networks 160, such as the Internet for example. The content-relevant ad server 150 may include ad information 155 which is used to target the ads to particular concepts or topics. As shown in FIG. 2, a set 280 of one or more ads 285 may be inserted into the documents, such as e-mail newsletters.

The Sprinks service offered by "About" of New York, N.Y. allows advertisers to insert ads targeted to topics from a predetermined lists in e-mail using dynamically generated images with client-side image maps and cookies.

U.S. patent application Ser. No. 10/452,830 (incorporated herein by reference and referred to as "the '830 application"), now pending, titled "SERVING ADVERTISEMENTS USING INFORMATION ASSOCIATED WITH E-MAIL", filed on Jun. 2, 2003 and listing Jeffrey A. Dean, Georges R. Harik and Paul Bucheit as inventors describes methods and apparatus for serving ads relevant to information in e-mail documents. The '830 application describes many alternative ways of serving ads with e-mail, including using applications on a sender client device, a recipient client device, a Web-based e-mail server, etc. In any event, the ads are targeted to relevance information (e.g., concepts, topics, etc.) that may be extracted from the content of (or other information derivable from) the e-mail.

Regardless of the system used to serve ads with e-mail, such as e-mail newsletters, it may be desirable to (i) obtain e-mail content information so that useful, content-relevant, ads may be served, and (ii) provide ads in a format that can be rendered on and supported by a wide variety of e-mail clients/readers, or at least prevalent e-mail clients/readers. This may be challenging since many, if not most, of the more popular Web-based e-mail clients strip out IFRAMEs and JavaScript. This may preclude some of the methods and apparatus described in the '900 application from being used to serve dynamic HTML ads.

Although some ad serving systems have a billing scheme based on the number of impressions, advertisers often want to be billed for served ads only when such ads produce a desired outcome. For example, advertisers may want to be billed per ad selection, or per conversion, or based on some other measurable notion of ad performance, rather than per impression. Moreover, some ad serving systems, such as Google AdWords, may use some performance parameter of ads in determining whether and/or how to serve ads. This allows such ad serving systems to serve more useful ads, or to serve more useful ads more prominently. Accordingly, it may be desirable to track user actions with respect to a served ad.

§2. SUMMARY OF THE INVENTION

The present invention describes methods, apparatus and data structures to meet one or more of the following challenges: (i) how to obtain content of (or content information from) documents like e-mail newsletters, particularly if such documents have certain code, such as JavaScript and IFRAMES, removed when viewed; (ii) how to serve a content-relevant ad request; and (iii) how to track user actions (e.g., selection, conversion, etc.) with respect to a served ad, and convey the observed user actions back to the ad served, all across a number of popular e-mail clients/readers.

The present invention may provide tools for document (e.g., e-mail newsletter) publishers to register their content (which may be required in order to target the ads to the content).

The present invention may be used to serve content-targeted ads with e-mail messages, such as HTML e-mail messages, and may do so without needing to use IFRAMEs or JavaScript. The present invention may do so by (i) having the document publisher include a unique content identifier in the content, (ii) having a client device pass the unique content identifier to a content-relevant ad server in a content-relevant ad request, and (iii) having the content-relevant ad server use the unique contend identifier to identify previously registered content for purposes of determining content-relevant ads. In the content-relevant ad server, multiple ads may compete for desired ad attributes (e.g., relative position on a page) or features. An arbitration process (e.g., an auction) may be used to chose and/or order the ads. By having the client device pass the unique content identifier to the content-relevant ad server when it needs the ads, the present invention permits ads to be chosen and generated all at the time the user reads (or more generally "opens") the e-mail document. This permits up-to-date (fresh) ad information to be used when serving ads, determining features (e.g., relative positions) of ads, billing for ad serving, etc.

Finally, the present invention may track user actions with respect to served ads. The present invention may do so by (i) using a dynamically generated (or cached) ad image to display ads in the document, and (ii) using an image map (that may have been included in the document originally served) to monitor user behavior with respect to an ad (e.g., to handle clicks on an ad) served in a document, such as an e-mail. The present invention may also encode all the information about the ad impression in a unique identifier (e.g., a cookie), which is returned, along with the ad image. The ad image and unique identifier may be provided to a client device. When a user selects (e.g., clicks on) an ad, this unique identifier may be returned to the ad server. A position of an image map clicked may also be returned to the ad server. The returned unique identifier and image position may be used to allow the ad server to determine which ad was selected. That is, the unique identifier permits a selection (or some other observed user action) to be matched with a previous ad serve (also referred to as a session).

The image including ads may be generated from HTML on the server-side.

The present invention may use a cookie as the unique identifier. In the context of e-mail served as a part of a newsletter, the present invention may set the cookies on a path that contains a unique per-newsletter ID. This may be used to ensure that a browser will only return the cookie that is relevant for a selection of (or conversion associated with) that ad. Instead of using cookies, the present invention may maintain a server-side cache containing the same information.

§3. BRIEF DESCRIPTION OF THE DRAWINGS

§4. DETAILED DESCRIPTION

Figure 1:
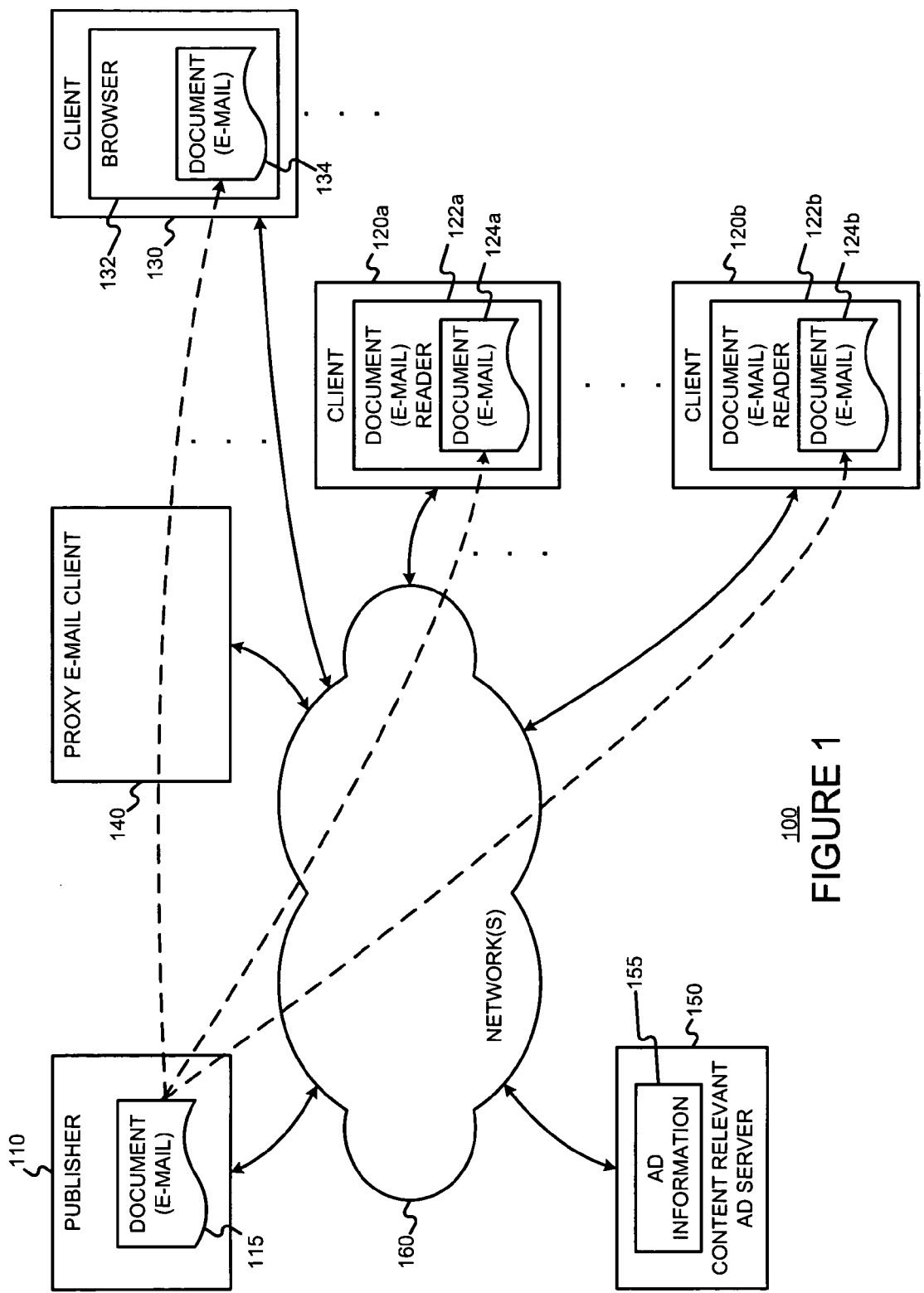
FIGS. 1 and 2 illustrate an environment in which the present invention may be used.
Figure 2:
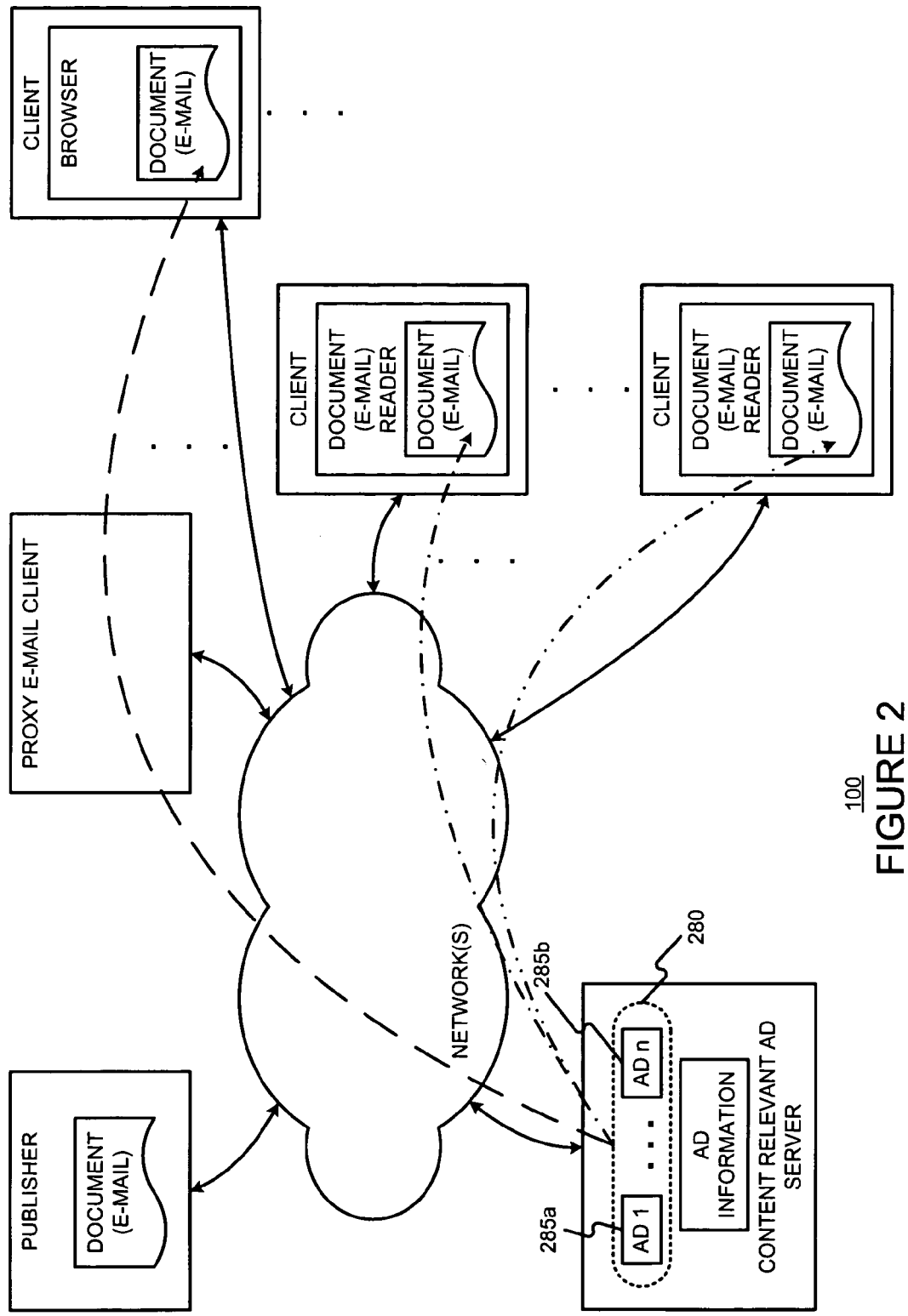

The present invention may involve novel methods, apparatus, message formats and/or data structures for a content-relevant advertising system. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, exemplary techniques for permitting document (e.g., e-mail newsletter) publishers to register their content, or information concerning their content, are described in §4.1. Exemplary techniques for serving ads and tracking user actions with respect to served ads are described in §4.2. Exemplary apparatus that may be used to perform various aspects of the present invention are described in §4.3. Finally some conclusions about the present invention are provided in §4.4.

§4.1 Content Registration

In one embodiment of the present invention, publishers may publish each issue of the newsletter to a separate public URL which is crawlable by a system such as some of those described in the '427 and '900 applications. Consistent with at least some of the embodiments described in the '427 and '900 applications, ads are served on Web pages. The URL of the Web page is passed in the impression request, and it is used to retrieve content of the Web page. Some, but not all, newsletters may be published at URLs where they can be crawled.

Alternatively, or in addition, the present invention may provide a Web interface which allows publishers to register their content. For example, the publisher can enter a URL which points to the content which will be published. Alternatively, or in addition, the publisher can paste the content directly into the Web interface. Whichever method the publisher chooses, the Web interface may provide the publisher with code (e.g., a snippet of HTML) to insert into its newsletter to facilitate the serving and/or tracking of ads.

In one embodiment of the present invention, the Web interface may immediately display examples of the ads likely to appear with the document. The Web interface may also allow the publisher to block individual ads. Such features provide publishers with a set of tools to facilitate a rich set of controls over ads to be served with their documents. The interface may include other tools to enable the publisher to control various aspects of ads to be served on their document(s).

Once registered, content may be handled in different ways, some of which may depend on how the content was registered by the publisher. For example, URL-based newsletters may be treated like any other content published on the Web, and may be crawled using a system such as some of those described in the '427 and '900 applications. In one embodiment of the present invention, the crawled content may drop out after a period of time (e.g., every two to three weeks) and may be re-crawled as needed. However, some documents might not be able to be provided with content-relevant ads immediately if they need to be crawled first. To avoid this, a special HTTP proxy may be provided to allow such a document (e.g., Web page) to be retrieved. In such a case, the code (e.g., HTML snippet) inserted into the document may simply reference the URL on the newsletter.

In contrast to URL-based newsletters, e-mail and Web interface content should not be dropped from a repository. Otherwise, it could be lost permanently because it might not be possible to crawl (or re-crawl) it. A separate repository or index may be provided for such content. Since this content will likely not be able to be crawled, it may be kept for a longer period of time (e.g., about six months). In one embodiment of the present invention, a single base_indexer, which will have content directly fed into it, may be provided. In this embodiment, the e-mail content may be provided with a special, easily identifiable, dummy URL. A new globally unique identifier (GUID) may be generated, and the newsletter may be added to the repository, keyed by the dummy URL:

http://emailcontent.google.com/<publisher-id>/<GUID>

For a particularly long newsletter with different sections concerning different topics or concepts, the publisher might want to serve different sets of ads inline with one or more of the different sections of content. This would be easy to accomplish, and could even be facilitated through the Web interface. For example, the publisher could simply paste the content sections in separate text boxes, and be provided with a different snippet (and globally unique identifier) (GUID) for each section. This will result in being able to serve more highly-targeted ads per e-mail document, without double serving.

It is believed that some publishers will not want to have to go to a Web interface for every issue of their newsletter in order to get a new snippet. For newsletters that don't change more often than once a week (e.g., weekly newsletters, biweekly newsletters, monthly newsletters, quarterly newsletters, etc.), it should be acceptable to provide the publisher a single, static, HTML snippet per newsletter. Content refresh could be triggered by an automated e-mail address, run by the ad server, which is subscribed to the newsletter. In such an embodiment, if a user opens an older e-mail, they might receive ads targeted to content in the most current e-mail newsletter issue, rather than the content in the opened e-mail newsletter issue. However, this should be an acceptable risk, particularly if the content of a series of weekly newsletters is related to common topics or concepts. This may become unacceptable for more frequent newsletters, such as daily newsletters, particularly if the topics or concepts of the content changes.

Alternatively, or in addition, the present invention may provide an e-mail interface by which publishers can register their newsletter content. Publishers may be provided with a web interface through which they can sign up for serving content-relevant ads in e-mail. To serve content-relevant ads, the publisher may insert an HTML snippet (or some other executable code) in the body of the e-mail. They may get this snippet initially either from a representative of the content-relevant ad server or through a self-service web interface. The publisher should use a different snippet for each different newsletter they wish to send out. However, once they have a snippet for a particular newsletter, they do not need to get a different one (unless they wish to change the ad format).

The publisher may also be given a registration e-mail address of the following form: newsletter-register+{ENPCID}@google.com. Each e-mail address of this form is for use only by a particular publisher. The ENPCID value in the e-mail address may be an ENcrypted version of the Publisher's Client ID which will allow the content-relevant ad server to validate incoming e-mails.

The publisher should subscribe the registration e-mail address to the newsletters that they wish to serve ads in. They may also send messages to this address by hand in order to preview ads that will or may be targeted to the content of the newsletter before sending the newsletter to all subscribers.

All mail to registration e-mail addresses may flow into the newsletter-register@google.com mailbox. The mailbox may then pass it to a mail filter. The mail filter may read the body of the e-mail, parse the HTML, and find one or more of the inserted HTML snippets in the body of the e-mail. The mail filter may then validate that the snippets are well-formed. It may also validate that the client-id in the snippet matches the decrypted version of the ENPCID value in the e-mail address.

The ENPCID value is essentially a shared secret between the content-relevant ad server and the publisher. The publisher's use of the ENPCTD value serves as proof that the publisher is in fact who they say they are, and helps prevent malicious mischief. A revocation list of ENPCID values may be used, so that in the case one is compromised, the publisher can simply be provided with a new one. The old one can be added to the revocation list. Any mail using an ENPCTD value on the revocation list is to be ignored.

The mail filter may read two other fields from the snippet: a CUID (content unique identifier) and an issue ID. The CUID should stay constant for a given newsletter, but the issue ID should be inserted by the publisher and is unique for different issues of the newsletter. The mail filter may use the CUID and the Issue ID to build a fake URL which is used as a key for the content of the e-mail. More specifically, the mail filter may append the content of the e-mail, keyed by this fake URL, to inserting the content of the e-mail into a repository that may be used by the content-relevant ad server. If new mail is received which has a CUID and Issue ID which are already in the repository, the existing content may be over written. This allows the publisher to send multiple versions of the newsletter during a testing process.

For a particularly long newsletter with different sections having different content, the publisher might want to serve different sets of ads inline with each different section of content. One embodiment of the present invention supports this. More specifically, the publisher can delineate multiple independent sections of the content to be targeted by enclosing them in the special start/end tags.

When multiple content sections are present, they may be matched, one-to-one, with the ad snippets present (i.e. ad spot 1 may be targeted to content section 1, and so forth.).

Having described various techniques for registering content of documents such as e-mail newsletters, various techniques for serving content-relevant ads and are described in §4.2 below.

§4.2 Serving Ads and Tracking User Actions with Respect to Served Ads

§4.2.1 Serving Ads

Since most, if not all, Web e-mail providers strip out all IFRAME tags and Javascript, some of the techniques for serving content ads described in the '900 application will not work with e-mail newsletters. Furthermore, it is difficult to insert any HTML into the body of the e-mail dynamically, at view time, while still supporting a wide array of e-mail clients (including web mail). To avoid these problems, one embodiment of the present invention serves ads as monolithic images (such as portable graphics network (PNG)

images for example), generated dynamically on a content-relevant ad server or some other server.

Figure 3:
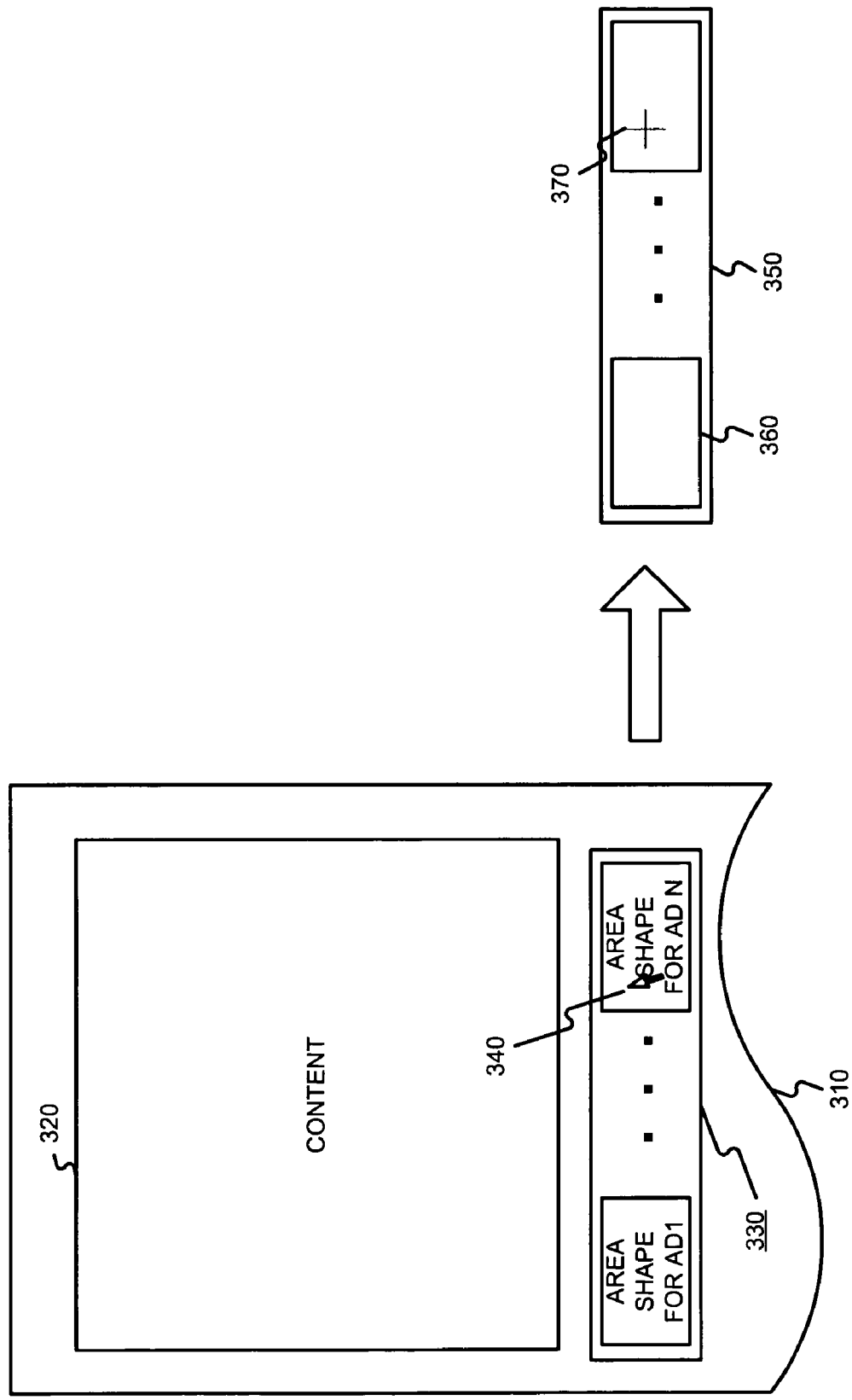
FIG. 3 illustrates using an image map, such as a client-side image map, to determine ad selection.

Clicks may be handled either through a server-side image map (See, e.g., the article, Patrick Corcoran, "Piecing Together Server-Side Image Maps," *WebMonkey* (Sep. 25, 1996) available at http://hotwired.lycos.com/webmonkey/html/96/39/index2a.html (incorporated herein by reference).) or a client-side image map (See, e.g., the article, Patrick Corcoran, "Client-Side Image Maps," *WebMonkey* (Oct. 2, 1996) available at http://hotwired.lycos.com/webmonkey/96/40/index2a.html (incorporated herein by reference).). Client-side maps may be more useful in applications, such as Hotmail for example, that do not support using server-side image maps because Hotmail rewrites all URLs in e-mail in order to redirect through their own server, and the extra parameters appended to the URL by the server-side map protocol causes their redirect server to malfunction. FIG. 3 illustrates a document 310 including content 320 and an image 330 with different shape areas, each of which correspond to different ads, as well as a cursor 340. An image map 350 may be used to determine a location 370 of the cursor 340 and whether or not a user selects (or otherwise acts on) one of the shape areas 360.

Using client-side maps may require (i) image ads with a static layout, and (ii) filling the same number of ad slots. In such cases, the content-relevant ad server may backfill empty ad slots with charity ads. Further, in such cases, if there are any elements in the design of the ad format that change size or move around, they might not be supportable with a client-side map. This is because once the format of a client-side image map has been designed and made public (e.g., inserted as code into a document e-mailed or published), it may be difficult to modify. Furthermore, if there are layout modifying changes to the client-side image map, such changes should be made to a copy of the document with a new name and a new identifier.

In one embodiment of the present invention, the following HTML snippet is given to the publisher for its newsletter:

```
<map name="google_ad_map_KX6hVSUhHerfm2B6XnGmhg">
<area shape="rect"
href="http://www.googleimageads.com/pagead/imgclick/
uRKegAPA5SESS cptqbhQ4A?pos=0&client=ca-foobar" coords=
"6,3,228,56">
<area shape="rect"
href="http://www.googleimageads.com/pagead/imgclick/
uRKegAPA5SESS cptqbhQ4A?pos=1&client=ca-foobar" coords=
"240,3,462,56">
</map>
<img src="http://www.googleimageads.com/pagead/ads?url=some-
url&output=png&cuid=uRKegAPA5SESScptqbhQ4A"
usemap="#google_ad_map_KX6hVSUhHerfm2B6XnGmhg">
```

Figure 5:
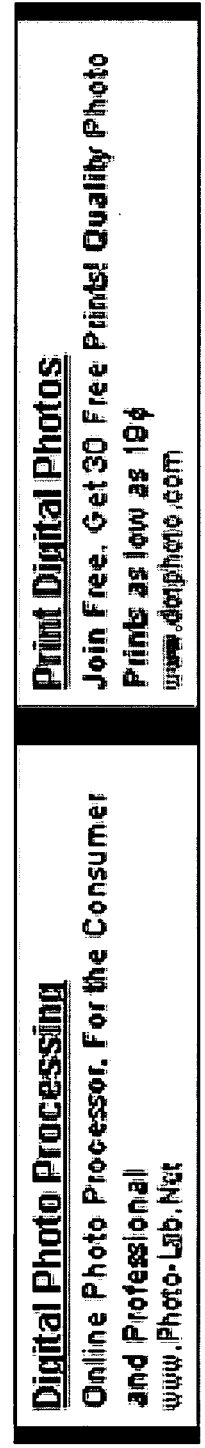
FIG. 5 illustrates exemplary image ads.

This will result in an image ad that looks like that shown in FIG. 5.

The first four parts of the snippet, namely,

```
<map name="google_ad_map_KX6hVSUhHerfm2B6XnGmhg">
<area shape="rect"
href="http://www.googleimageads.com/pagead/imgclick/
uRKegAPA5SESS cptqbhQ4A?pos=0&client=ca-foobar" coords=
"6,3,228,56">
<area shape="rect"
```

*-continued*

```
href="http://www.g ogl imag ads.com/pag ad/imgclick/
uRKegAPA5SESS cptqbhQ4A?pos=1&client=ca-foobar" coords=
"240,3,462,56">
</map>
``` define a client-side image map. The middle two parts define two rectangular area shapes, one with upper left and lower right corners at coordinates {6,3} and {228,56}, respectively, and the other with upper left and lower right corners at coordinates {240,3} and {462,56}, respectively. The area of the first area shape is defined as "pos=0", while the area of the second area shape is defined as "pos=1".

The last part of the snippet, namely,

```
<img src="http://www.googleimageads.com/pagead/ads?url=some-
url&output=png&cuid=uRKegAPA5SESScptqbhQ4A"
usemap="#google_ad_map_KX6hVSUhHerfm2B6XnGmhg">
``` serves to (i) point to the source of the image, and (ii) point to the client-side image map just described above. More specifically, the source of the image is at the address http://www.googleimageads.com/pagead/ads?url=some-url&output=png&cuid=uRKegAPA5SESScptqbhQ4A. The output format is an "output=png" image. The image source also includes the unique content identifier "cuid=uRKegAPA5SESScptqbhQ4A", the use of which is described later. ("CUID" stands for "content unique-id.") Finally, this code points to the client-side image map using the "google_ad_map_KX6hVSUhHerfm2B6XnGmhg" string to relate it to the map name.

Figure 6:
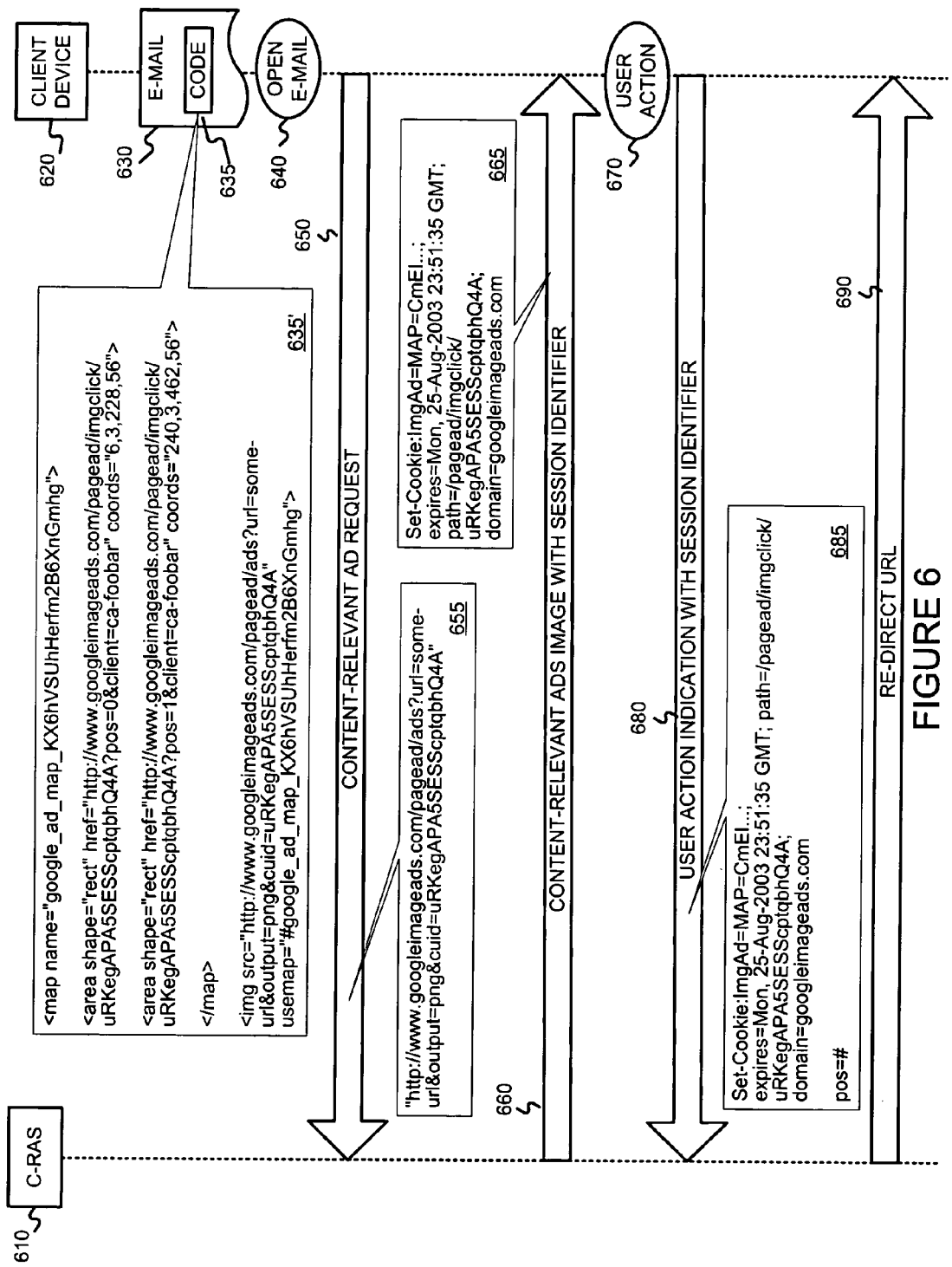
FIG. 6 is a messaging diagram illustrating exemplary operations of an exemplary embodiment of the present invention.

The messaging diagram of FIG. 6 illustrates how this exemplary embodiment may include code 635, and in particular snippet 635', in an e-mail document 630 residing on a client device 620. The code 635/635' may have been inserted in the e-mail document 630 by the e-mail document publisher, for example during a registration process such as those described in §4.1 above.

At viewing time (e.g., when a user opens an e-mail), the above HTML snippet causes the client device (e.g., a browser or e-mail application) to make a request for an ads image to www.googleimageads.com. The request may actually include the entire path http://www.googleimageads.com/pagead/ads?url=some-url&output=png&cuid=uRKegAPA5SESScptqbhQ4A. This request goes to (e.g., a front-end of) a content-relevant ad server. In one embodiment, the front-end of the content-relevant ad server passes the request to a back-end, using the URL passed in the request. Referring again to the messaging diagram of FIG. 6, when the user opens an e-mail (Event 640), the client device 620 may submit a content relevant ad request 650 to a content-relevant ad server 610. As shown, the request 650 may simply be the image source 655 from the snippet 635' originally in the e-mail document 630.

The content-relevant ad server may use the unique content identifier (e.g., specified by the "cuid=uRKegAPA5SESScptqbhQ4A" part of the request) as a key to look up previously registered content, or at least relevance information (e.g., topics, concepts, etc.) associated with the previously registered content. The content-relevant ad server 610 may then use such previously registered content, or relevance information associated with it, to determine relevant ads. The content-relevant ad server 610 may use techniques such as those described in the '427 application and/or the '900 application, both introduced above, to determine one or more ads relevant to the content of the e-mail 630 document. The relevant ads may be scored using one or more of price information, performance information, advertiser quality information, etc. Attributes (e.g., positions) of the ads may be determined using the determined scores.

The content-relevant ad server may then format the ads determined (e.g., obtained from a back end) to HTML using the specified ad format (468×60 in this example). Since the ad request that was generated using the HTML snippet that set the output=png option, instead of returning the HTML ads, the content-relevant ad server returns a PNG image. The PNG image may have been generated from the HTML ads on the server-side, as described in §4.2.3 below. With the image of the one or more ads, the (e.g., front-end of the) content-relevant ad server may also return a session identifier (e.g., a cookie). If a cookie is used, it may look like the following.

---

S t-Cookie:ImgAd=MAP=CmElBhADGN4BIDUqGGh0dHA6Ly93d3
cuZGI2ZWxvZGdILmNvbTI8QWRJaGlEMnBTXzhmemIVSTNzODYt
QnpJRGdDSXRDdzZfM2VBd05lYkFNRXctUEZBODFMUkFDRU
FtV0FBCnkl8AEQAxjeASA1Ki9odHRwOi8vY2hlYXBjYXJpYmJlYW
4uY29tL3NwZWNpYWxzL3NwZWNpYWxzLmNmbTl8QXFmX19
EMnBTXzhmemIVSTNzODYtQnpJREVESy1CZ3B6WkNFd05lYkFISX
ctUEZBNDiyUUFDSUFtV0FB;
expires=Mon, 25-Aug-2003 23:51:35 GMT;
path=/pagead/imgclick/uRKegAPA5SESScptqbhQ4A;domain=
googleimageads.com

---

The value of the MAP parameter in this exemplary cookie is a compressed, Base64-encoded binary data incorporated the following fields for each region:

```
parsed message ImageClickRegion {
    required int32 left = 1;
    required int32 top = 2;
    required int32 width = 3;
    required int32 height = 4;
    optional string url = 5;
    optional string clickstr = 6;
};
parsed message ImageAdCookieProto {
    repeated message<ImageClickRegion> region = 1;
};
```

The protocol buffer is a list of rectangular regions in the ads image. The protocol buffer may also define a redirect URL (e.g., an ad landing page) and clickstring (if any) for each of the rectangular regions.

Referring once again to the messaging diagram of FIG. 6, in an exemplary embodiment, the content-relevant ad server 610 can send a content relevant ads image (e.g., a PNG image), along with a session identifier (e.g., a cookie such as that abbreviated in 665), to the client device 620 as indicated by message 660.

Note that the bounding rectangle information in the cookie may be used in the case of a server-side map implementation. It is not required with a client-side image map—a parameter that specifies a numerical index is obtained instead.

§4.2.2 Tracking User Actions with Respect to Ads

When the ads image is selected (e.g., clicked), the user device will go to one of the URLs defined in the client-side map. The (e.g., front end of the) content-relevant ad server may be used to choose the correct redirect URL using the "pos=" parameter in the URL defined in the client-side image map. Pursuant to the selection of the ad, the client device may also send some indication of the user action with respect to an ad and a session identifier (e.g., a cookie) back to the content-relevant ad server. For example, referring once again to FIG. 6, in response to a user action event 670, the client device 620 sends back an indication of the user action with respect to an ad, as indicated by message 680. Since the path set on the cookie (in this example, "pagead/imgclick/uRKegAPA5SESScptqbhQ4") matches the click URL path, the cookie 685 may be sent along as well. As can be appreciated by comparing message content 655 and message content 665, the cookie path in message 665 may be set by the content-relevant ad server 610 using the "cuid=" parameter in the image request 655. That is, the CUID should match the GUID in the paths of the click URLs. Finally, the content-relevant ad server 610 may provide a redirect URL (used for directing the user's browser to a landing page associated with the selected ad) to the client device 620 as indicated by message 690.

The GUID on the path may be used to ensure that the client device browser will only return a cookie for the current newsletter, rather than having the browser send all the cookies that may have been set for impressions on various newsletters. The GUID on the path may also be used to ensure that ads sent by different publishers or by the same publisher in different newsletters will not interfere with each other's cookies. In one embodiment of the present invention, each publisher may have a GUID defined per newsletter issue and the cookie may be set on the domain googleimageads.com. This may be used to ensure that no google.com cookies are received on a click request, which may be used to enforce a policy of not linking content-ad clicks to google.com cookies. A domain (googleadservices.com) which allows cookies on content-relevant ads may be used for conversion tracking. However, it may be difficult to reuse this domain because some browsers impose a cookie limit (e.g., of 30 cookies) per domain, and reusing the domain might unnecessarily reduce either service's cookie limit.

In one embodiment of the present invention, since the image URL is fixed, and cannot contain a "random=" parameter that is set at view time, the (e.g., front end of the) content-relevant ad server may set all possible headers to keep the browser from caching the image.

The exemplary cookie scheme described above works with the Hotmail and Yahoo Mail Web-based mail servers, using the Internet Explorer and Mozilla browsers. If a P3P header acceptable to Internet Explorer is set, it also works in Outlook, and Outlook Express. Taken together, this covers a large percentage of existing e-mail clients in terms of number of users. Even if the foregoing exemplary cookie scheme does not work with some e-mail clients, such as clients with cookies turned off, it should not otherwise adversely affect the recipient of the newsletter.

Other schemes for determining user actions, such as those described in U.S. patent application Ser. No. 10/653,899, now pending, (incorporated herein by reference) titled "SYSTEMS AND METHOD FOR DETERMINING USER ACTIONS," filed on Sep. 4, 2003, and listing Alex Roetter and Deepak Jindal as inventors may be used instead of, or in addition to, the techniques described above.

§4.2.3 Image Ad Generation

In a refined embodiment of the present invention, e-mail publishers are provided with flexible formatting for ads, such as that available to Web publishers, by using the HTML produced by any template to directly generate an image on the server side. For example, a facility (e.g., a separate server) may be provided with an HTML document. The facility may use the HTML document to generate an image (e.g., PNG image), along with a list of (rect, URL) pairs which correspond to all anchors (clickable regions) in the document (collectively referred to as an "image ad").

In an embodiment in which the facility is a separate server, (e.g., the front-end of) the content-relevant ad server may exchange information with one or more separate servers. When the content-relevant ad server receives a request with "output=png," it may first handle the request normally as if it were going to output HTML. Then, instead of returning the HTML to the client, it may pass it to a separate server. The separate server may then generate an image ad and return it to (the front end of) the content-relevant ad server, which returns it to the client device. When the user clicks on an image ad, (e.g., the front end of) the content-relevant ad server may handle the image click request by decoding which ad was clicked on and redirecting it to a click handler.

§4.2.3.1 Image Ad Generation Performance Enhancements

In the foregoing example, the separate server always generates an image ad for each request. However, the image ads returned may be cached. A fingerprint of the HTML itself may be used as the key to the cache entry, but the following considerations should be met. Since the clickstrings in the HTML are always unique, the entire HTML, by itself, would never produce any hits to the image ad cache. One way to avoid this problem is to strip the clickstrings out of the HTML. Another way is to use a fingerprint based on the exact list of ad creative-ids and the name of the format (the format HTML and the creative text for a given creative ID are both immutable).

The number of newsletter ad impressions is expected to be higher by orders of magnitude than the actual numbers of newsletters sent out. Since all of the ad impressions for a single newsletter share the same content, the number of distinct sets of ads generated per newsletter will typically be bounded by some small number, which will increase slowly over time as budgets expire. Generally, a higher number of ad slots results in a higher number of combinations. Since there is some asymptotic ceiling on the number of combinations, the higher the number of impressions, the better the expected cache hit rate. Thus, caching image ads should greatly improve performance, at least in the newsletter market. Given the expected high cache hit-to-miss ratio, serving image ads in newsletters should not place high throughput demands on the separate server.

Since the vast majority of requests hit the cache, the latency requirements for newsletter ads should not be a problem. A latency of a 500 ms might be acceptable, since that might only apply to 1 in 200 pageviews. However, much better performance (approximately 140 ms latency for the separate server to render a set of ads) is expected. Load testing on a single content-relevant ad server using a single separate server indicates that the separate server as written (single-threaded) can handle seven (7) content ad render requests/sec, and its median latency is 115 ms, with 99% of requests taking less than 140 ms.

§4.2.4 Detecting Ad Selection and Measuring Performance

Cookies may be detected using the following techniques. The first time a user gets a newsletter with the ads, the image may look for a cookie set on the googleimageads.com domain that consists of GoogleCookieTest=1. If it is found, the ad may be served normally. If not, the GoogleCookieTest cookie may be set and the browser may be redirected to a different url that may then check for the cookie again. If the cookie is present, the ad image may be sent. Otherwise, whitespace may be served. In fact, in any error situation on the image request, a transparent GIF may be served.

§4.2.5 Alternative Embodiments

A first alternative embodiment uses some combination of Javascript and/or IFRAMES. This alternative is advantageous in that everything works just like a Web page. Unfortunately, however, some popular Web-based e-mail servers such as Hotmail and Yahoo strip both of these.

A second alternative embodiment is simply to insert ads at the time the e-mail is sent (or before). For example, the publisher can make XML requests at newsletter generation time for each recipient and embed ads in the text of the newsletter. This alternative lets the publisher format the ads anyway they want. Unfortunately, however, this may be unweildy or impossible for low-tech publishers. Further, there may be problems with accounting for ads sent to users that never look at them. That is, an ad may be inserted to an e-mail that is never opened. Furthermore, with this scheme, information used when serving and/or ranking ads may be stale by the time the ads are rendered. For example, an impression may occur after an advertiser has already closed their account or reached some budget limit.

In a third alternative embodiment, publishers could send the email through the provider of content-relevant ads. The provider could insert images and/or html into the e-mail and send it on to users. Since the provider of the content-relevant ads can access the content of the e-mail newsletter, this alternative advantageously removes the need for e-mail publishers to register their newsletters. However, from the perspective of the provider of content-relevant ads, this alternative adds the responsibility of sending a lot of e-mail. This alternative also forces publishers to use the content-relevant ad service as their e-mail delivery provider.

Rather than use a client-side image map, a server-side image map may be used. As discussed above, such an alternative may cause problems when used with some Web-based e-mail servers that use redirects. There are alternative variants on using a server-side image map. In these variants, an image for the ad is created, and as the x,y positions of clicks are received, they are mapped to the ad that was selected.

In a GUID-per-recipient variant of the server-side image map, the publisher provides a global unique identifier for each recipient that can be used to identify the impression for a click. Unfortunately, however, publishers need to know how to add a GUID, and must be willing to do so. These GUIDs will have to be merged in to each recipient's message as it is sent. Moreover, a cache of GUID-to-ads mappings (with a very long time-to-live) needs to be maintained. Furthermore, this variant might not work for recipients of newsletters who are themselves mailing lists with multiple subscribers. That is, this variant might not work when recipients of the newsletter start forwarding it to others In an IP address variant of the server-side image map, the IP address of the e-mail recipient is used as a GUID. This relieves the publishers of needing to add a GUID. Unfortunately, however, users coming through proxies could get the wrong ad on a click. Moreover, like the GUID-per-recipient variant described above, a cache of GUID-to-ads mappings (with a very long time-to-live) may need to be maintained.

§4.3 Exemplary Apparatus

Figure 4:
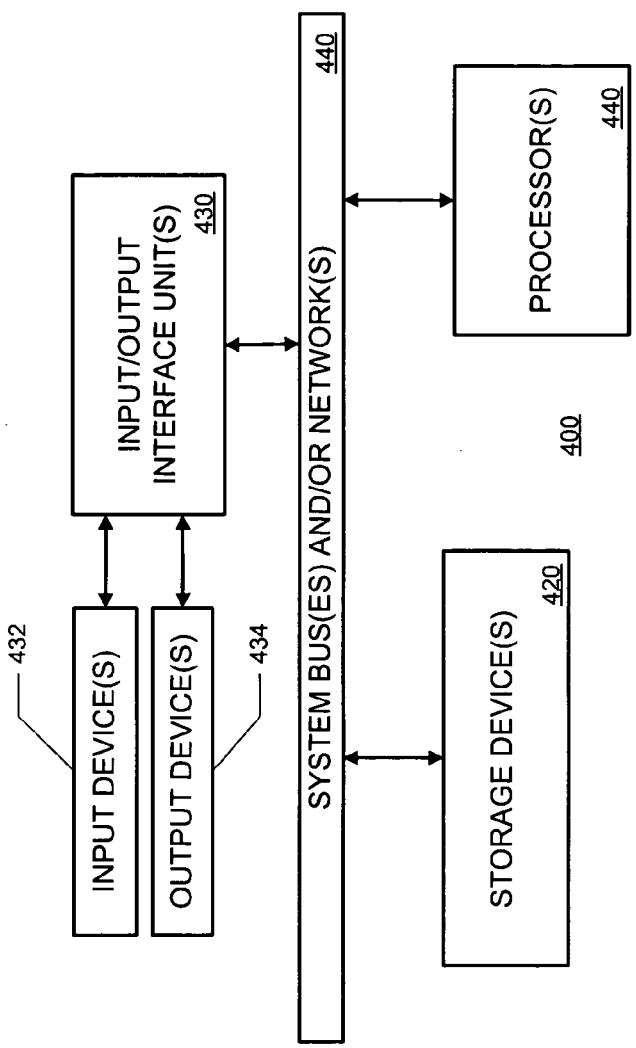
FIG. 4 is a block diagram of exemplary apparatus that may be used to perform various aspects of the present invention.

FIG. 4 is high-level block diagram of a machine 400 that may perform one or more of the operations discussed above. One or more such machines 400 may be used as a content-relevant ad server, a separate server, client devices, etc. The machine 400 basically includes one or more processors 410, one or more input/output interface units 430, one or more storage devices 420, and one or more system buses and/or networks 440 for facilitating the communication of information among the coupled elements. One or more input devices 432 and one or more output devices 434 may be coupled with the one or more input/output interfaces 430.

The one or more processors 410 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 420 and/or may be received from an external source via one or more input interface units 430.

In one embodiment, the machine 400 may be one or more conventional personal computers. In this case, the processing units 410 may be one or more microprocessors. The bus 440 may include a system bus. The storage devices 420 may include system memory, such as read only memory (ROM) and/or random access memory (RAM). The storage devices 420 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 432, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 410 through an appropriate interface 430 coupled to the system bus 440. The output devices 434 may include a monitor or other type of display device, which may also be connected to the system bus 440 via an appropriate interface. In addition to (or instead of) the monitor, the personal computer may include other (peripheral) output devices (not shown), such as speakers and printers for example.

§4.4 CONCLUSIONS

The embodiment of the invention that uses client-side image maps and cookies has a number of advantages. Cookies are an effective way of matching an ad click to a particular ad impression. Since it is difficult, if not impossible, to add HTML into the e-mail body at view-time, and ad impression cannot be determined with certainty until view-time, the cookie is useful in matching a user action, such as a click, with the impression. Another possible solution would be for every instance of the newsletter sent out (i.e. one instance per recipient), to include a different globally unique ID. This alternative has the disadvantage of needing to keep track of millions of these GUIDs for indefinite periods of time. This alternative would also be much more inconvenient for the newsletter publisher, since it would have to request a new HTML snippet for each recipient. With the cookie, no state about the impression needs to be stored on server-side.

In the embodiment described above, the only information obtained from the cookie when the user performs a click is information that was already available when the ad impression was generated. There need not be any personally identifiable information in the cookie whatsoever, and the cookie need not be linked to any other cookies. The cookie need not live for more than an hour, or even less.

Although the ImgAd cookie could be a session cookie, which is valid only within the constraints of a single browser window, this may fail under certain conditions. For example, if the user receives e-mail in Outlook or Outlook Express, the ad click may open a second browser window, and that browser window might not share the same session cookies as the original window. Thus, instead of using a session cookie, a cookie with a short expiration time (approximately one hour) is preferred.

What is claimed is:

1. A computer-implemented method for determining content-relevant ads once an e-mail document is rendered on a client device, the method comprising:
    a) providing, from the client device, a document identifier in an ad request to a content-relevant ad server;
    b) using, at the content-relevant ad server, content-relevance information associated with the document identifier and ad information to determine a set of one or more ads;
    c) generating an image including the one or more ads of the determined set;
    d) providing the generated image and a session identifier to the client device;
    e) rendering, with the client device, the image in the document;
    f) detecting a user action with respect to the rendered image; and
    g) in response to the detection of the user action with respect to the rendered image, sending the session identifier and position information to the content-relevant ad server,
    wherein the image includes at least two ads,
    wherein the user action is a user selection of one of the at least two ads included within the image, and
    wherein the position information is a position of a cursor within the image at the time of a user selection.

2. The computer-implemented method of claim 1 wherein the document includes image map information including image source information, and wherein the image source information includes the document identifier.

3. The computer-implemented method of claim 1 wherein the document includes image map information including image source information, and wherein the image source information is a path including the unique identifier.

4. The computer-implemented method of claim 3 wherein the path further includes a URL of the content-relevant ad server.

5. The computer-implemented method of claim 1 further comprising:
   h) updating, with the content-relevant ad server, ad information using the sent session identifier and position information.

6. The computer-implemented method of claim 5 wherein the ad information updated includes billing information.

7. The computer-implemented method of claim 5 wherein the ad information updated includes ad performance information.

8. Apparatus for determining content-relevant ads once an e-mail document is rendered on a client device, the apparatus comprising:
   a) an input for accepting, from the client device, a document identifier in an ad request;
   b) using content-relevance information associated with the document identifier and ad information to determine a set of one or more ads;
   c) generating an image including the one or more ads of the determined set;
   d) forwarding the generated image and a session identifier to the client device,
      wherein, the generated image and session identifier include information which facilitates having the client device send the session identifier and position information to the content-relevant ad server in response to the detection of the user action with respect to the image as rendered on the client device,
   wherein the image includes at least two ads,
   wherein the user action is a user selection of one of the at least two ads included within the image, and
   wherein the position information is a position of a cursor within the image at the time of a user selection.

9. The apparatus of claim 8 wherein the document includes image map information including image source information, and wherein the image source information includes the document identifier.

10. The apparatus of claim 8 wherein the document includes image map information including image source information, and wherein the image source information is a path including the unique identifier.

11. The apparatus of claim 10 wherein the path further includes a URL of the content-relevant ad server.

12. The apparatus of claim 8 further comprising:
   e) updating, with the content-relevant ad server, ad information using the sent session identifier and position information.

13. The apparatus of claim 12 wherein the ad information updated includes billing information.

14. The apparatus of claim 12 wherein the ad information updated includes ad performance information.

15. A computer-implemented method for determining content-relevant ads once an e-mail document is rendered on a client device, the method comprising:
   a) accepting, from the client device, a document identifier in an ad request to a content-relevant ad server;
   b) using content-relevance information associated with the document identifier and ad information to determine a set of one or more ads;
   c) generating an image including the one or more ads of the determined set;
   d) forwarding the generated image and a session identifier to the client device; and
   e) accepting, from the client device, the session identifier and position information,
   wherein the image includes at least two ads,
   wherein the user action is a user selection of one of the at least two ads included within the image, and
   wherein the position information is a position of a cursor within the image at the time of a user selection.

16. The computer-implemented method of claim 15 wherein the document includes image map information including image source information, and wherein the image source information includes the document identifier.

17. The computer-implemented method of claim 15 wherein the document includes image map information including image source information, and wherein the image source information is a path including the unique identifier.

18. The computer-implemented method of claim 17 wherein the path further includes a URL of the content-relevant ad server.

19. The computer-implemented method of claim 15 further comprising:
   f) updating ad information using the sent session identifier and position information.

20. The computer-implemented method of claim 19 wherein the ad information updated includes billing information.

21. The computer-implemented method of claim 19 wherein the ad information updated includes ad performance information.

22. The computer-implemented method of claim 1 wherein the document is an e-mail.

23. The apparatus of claim 8 wherein the document is an e-mail.

24. The computer-implemented method of claim 15 wherein the document is an e-mail.

25. The computer-implemented method of claim 1 wherein the set of one or more ads are determined to be relevant to the content of the document.

26. The apparatus of claim 8 wherein the set of one or more ads are determined to be relevant to the content of the document.

27. The computer-implemented method of claim 15 wherein the set of one or more ads are determined to be relevant to the content of the document.

28. A computer-implemented method for determining content-relevant ads once an e-mail document is rendered on a client device, the method comprising:
   a) providing, from the client device, a document identifier in an ad request to a content-relevant ad server;
   b) using, at the content-relevant ad server, content-relevance information associated with the document identifier and ad information to determine a set of at least two ads;
   c) generating an image including at least two ads of the determined set of at least two ads;
   d) providing the generated image and a session identifier to the client device;
   e) rendering, with the client device, the image in the document;
   f) detecting a user selection within the rendered image;
   g) in response to the detection of the user action with respect to the rendered image, sending the session identifier and position information to the content-relevant ad server; and
   h) using the sent session identifier and position information to determine a particular ad that was selected by the user.

29. The computer-implemented method of claim 28 further comprising:
   i) loading a new document, identified by the selected particular ad, onto the user device.

30. The computer-implemented method of claim 28 further comprising:
   i) updating performance information associated with the selected particular ad.

31. A computer-implemented method for determining content-relevant ads once an e-mail document is rendered on a client device, the method comprising:
   a) accepting, from the client device, a document identifier in an ad request to a content-relevant ad server;
   b) using content-relevance information associated with the document identifier and ad information to determine a set of at least two ads;
   c) generating an image including at least two ads of the determined set of at least two ads;
   d) forwarding the generated image and a session identifier to the client device;
   e) accepting, from the client device, the session identifier and position information responsive to a user selection within the image; and
   f) using the session identifier and position information to determine a particular ad that was selected by the user.

32. The computer-implemented method of claim 31 further comprising:
   g) loading a new document, identified by the selected particular ad, onto the user device.

33. The computer-implemented method of claim 31 further comprising:
   g) updating performance information associated with the selected particular ad.

* * * * *